Feb. 14, 1956 K. C. AUGENSTEIN 2,734,339

EXPANSIBLE SELF-RETRACTING LINKAGE

Filed May 11, 1955 4 Sheets-Sheet 1

Inventor
Karl C. Augenstein
by Dike, Thompson & Sanborn
att'ys.

Feb. 14, 1956 K. C. AUGENSTEIN 2,734,339

EXPANSIBLE SELF-RETRACTING LINKAGE

Filed May 11, 1955 4 Sheets-Sheet 2

Inventor
Karl C. Augenstein
by Dike, Thompson & Sanborn
att'ys.

Feb. 14, 1956 K. C. AUGENSTEIN 2,734,339

EXPANSIBLE SELF-RETRACTING LINKAGE

Filed May 11, 1955 4 Sheets-Sheet 3

Inventor
Karl C. Augenstein
by Dike, Thompson & Sanborn
att'ys.

EXPANSIBLE SELF-RETRACTING LINKAGE

Filed May 11, 1955 4 Sheets-Sheet 4

INVENTOR.
Karl C. Augenstein
BY
Dike, Thompson & Sanborn
Attys.

United States Patent Office 2,734,339
Patented Feb. 14, 1956

2,734,339

EXPANSIBLE SELF-RETRACTING LINKAGE

Karl C. Augenstein, Cranston, R. I., assignor to Speidel Corporation, Providence, R. I., a corporation of Rhode Island Application May 11, 1955, Serial No. 507,608
22 Claims. (Cl. 59—79)

The present invention relates to extensible linkages such as are suitable for use as bracelets for wrist watches and the like.

In the extensible linkage of the present invention, a single row of top links are resiliently and flexibly joined by bottom links and intermediate links or bottom link connecting members which are underneath the top links and above the bottom links. The top links are normally urged into abutting relationship by springs associated with the bottom links and the top links in the preferred embodiment or the intermediate links in another embodiment. The top links automatically separate from each other along the length of the bracelet against the tension of the springs when the bracelet is extended so that the bracelet expands to slip over the wearer's hand and then automatically contracts to fit snugly on the wearer's wrist.

In the preferred embodiment each of the top links extend across the linkage from side to side and hence substantially all of the intermediate and bottom links are covered and so hidden from view by the top links, but at the same time the linkage had adequate flexibility. Furthermore, the arrangements of the parts are such that the linkage can be lengthened or shortened by hand without cutting, without tools and without altering the mechanical structure in any way. This can be done by any person by inserting or removing a detachable spacer link by hand in a matter of seconds. This spacer link fits longitudinally between two adjacent top links and enables the wearer to obtain a proper length linkage without altering the mechanical structure in any way.

Also, the arrangement of the parts is such that there are suitable surfaces on which jewels or personal initial plates for ornamentation may be mounted. In the extensible linkage of the present invention in a bracelet of the usual width the top links are easily adapted to carry jewels or initial plates or if preferred they may be made with ornamental holes through the center.

A linkage made according to this invention has fewer parts than present extensible linkages and hence is more economical to manufacture. However, it is equally as extensible and equally flexible.

Further objects and advantages will be apparent from the following description and accompanying drawings in which.

Referring to Figs. 1 to 8 of the drawings, the linkage 10 of the present invention comprises top links L resiliently connected in series by intermediate links C and bottom links B. The top links L extend from side to side across the linkage, the intermediate links are disposed underneath the top links and the bottom links are disposed underneath the intermediate links.

A pair of intermediate links C are arranged between each two adjacent top links approximately at the opposite side edges of the top links and substantially parallel thereto and are pivotally connected to the top links by bottom links B. At each of two opposite edges of each top link a pair of bottom links have inward ends pivotally connected to the top link and the outward ends pivotally connected to the ends of the adjacent intermediate links.

In the preferred embodiment of the extensible linkage 10, as shown, the intermediate links C are made up of two similar members 11*a* and 11*b* (Fig. 6), joined end to end by the tongue 12*b* on the end of the member 11*b* which is bent downwardly through a slot 13*a* formed in one end of the member 11*a* by the downwardly depressed tongue 13*b*. This connection forms a hinged intermediate link between each pair of bottom links which allows the linkage to be laid flat on a counter for display purposes and to be packaged and also to be flexed transversely of each intermediate link so as to automatically fit the wearer's wrist in use. These hinges are so constructed that they do not interfere with expansion or contraction of the linkage when it is placed upon and removed from the wrist of the wearer.

Figure 7:
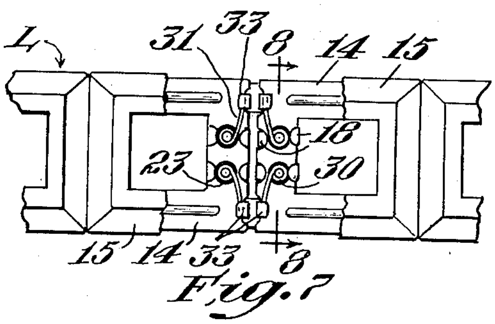
Fig. 7 is a top plan view of the linkage in retracted position with part of the top shells of two adjacent top links broken away to reveal part of the connections between two top links and four bottom links.
Figure 6:
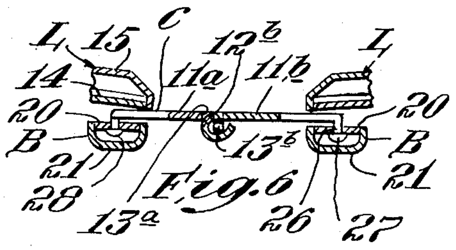
Fig. 6 is a section along the line 6—6 of Fig. 4.

Referring to Figs. 6 and 7, the top links L comprise plates 14 covered by ornamental top shells 15 which are secured thereon by conventional means such as lugs, not shown, extruded from the edges of the top shells and rolled over the edge of the plate. As shown, the plates 14 and the top shells 15 form hollow squares but it will be appreciated that the top shells and corresponding plates may be made of any desired shape or size and that the top shells may be made of any desired configuration without departing from the spirit of this invention.

The bottom links B (Figs. 4, 6 and 8) comprise a plate 20 with a hollow cap or shell 21 secured over the bottom surface thereof by conventional means such as lugs, not shown, extruded from the edge of the shell 21 and rolled over the edges of the plate 20.

Figure 4:
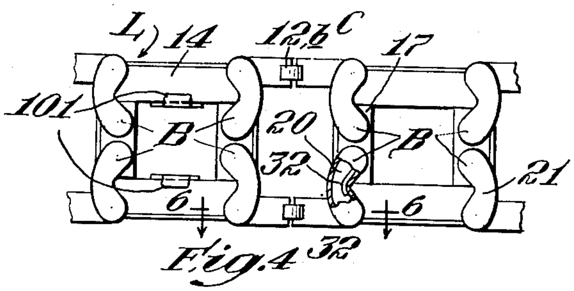
Fig. 4 is a bottom plan view similar to Fig. 3, but showing the links in extended position and the shell of one of the bottom links being broken away.
Figure 5:
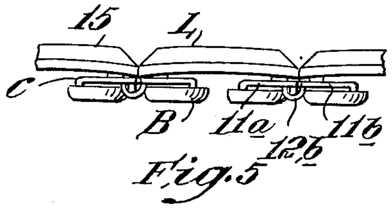
Fig. 5 is a side elevation of a portion of the linkage in retracted position.

As seen in Figs. 4 and 5, the bottom links B are attached to the undersides of the top links L and the intermediate links C. In order to provide clearance for the ends of the intermediate links, spacing blocks 17 (Figs. 4, 7 and 8) are attached to the ends of the bottom links which are to be attached to the top links. The ends of the bottom links are pivotally attached to the spacing blocks 17 which are then attached to the undersides of the plates 14 by lugs 18 on the blocks which are rolled over the edges of the plates as shown in Fig. 7. The lugs 18 are located in notches in the edges of the plates 14 so as not to interfere with the fitting of the top shells 15 over the plates.

The caps 21 of the bottom links B which are at the underside of the linkage are made with smooth surfaces since they are next to the arm of the wearer.

To pivotally connect each bottom link B to the top link L, a hollow rivet 23 (Fig. 8) projects upwardly from one end of the plate 20, extends through a hole in the bottom of the spacing block 17 and is peened over in the spacing block before the spacing block is secured to the plate 14 by the lugs 18 as described above.

At the other end of each bottom link B is a hole 26 (Fig. 6) in the plate 20 to pivotally receive a lug which is extruded from the end of the part 11*a* or 11*b* of the intermediate links C and bent approximately at right angles thereto. The lugs extend through the holes 26 and are peened over to form enlarged heads 27 and thus to pivotally connect the bottom links and the intermediate links.

Figure 8:
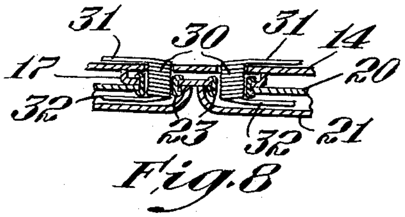
Fig. 8 is a section along the line 8—8 of Fig. 7.
Figure 9:
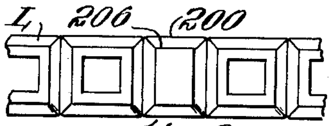
Fig. 9 is a top plan of the linkage of the present invention in retracted position with one type of detachable spacer link inserted therein for lengthening the linkage.
Figure 14:
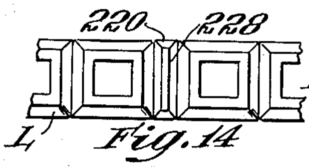
Fig. 14 is a top plan similar to Fig. 9 showing another type of detachable spacer link.
Figure 19:
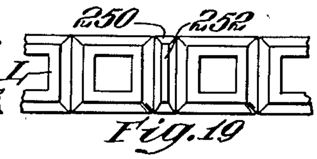
Fig. 19 is a top plan similar to Figs. 9 and 14 showing yet another type of detachable spacer link.

Referring to Figs. 4, 7 and 8, the coil springs 30 extend through the hollow rivets 23 and through the holes in the plates 14, have laterally extending fingers 31 and 32 at their respective ends and are arranged to urge the top links L together. The fingers 31 extend along the top sides of the plates 14 and are held by lugs 33 which are extruded upwardly from the edges of the plates. The fingers 32 extend along the plates 20 of the bottom links B and are held in place by engaging the side of the wall of the caps 21 of the bottom links as shown in Fig. 4. It will be appreciated that the coil springs being under tension urge the outward ends of the bottom links B to pivot toward the centers of the top links and draw the ends of the intermediate links in under the respective top links which are thereby drawn together.

Figure 1:
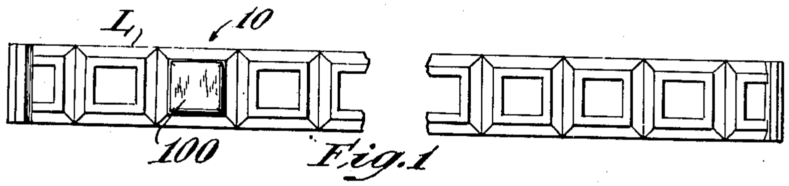
Fig. 1 is a fragmentary top plan view of an extensible linkage embodying the present invention, the links being in retracted position.
Figure 2:
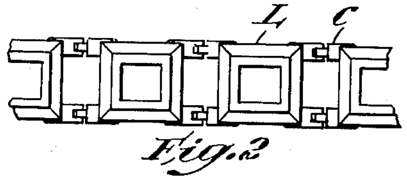
Fig. 2 is a top plan view showing a portion of the linkage of Fig. 1 in extended position.
Figure 3:
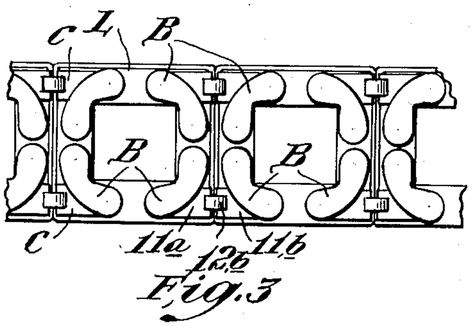
Fig. 3 is an enlarged fragmentary bottom plan view of a portion of the linkage, the links being in retracted position.

Jewels, initial plates or other ornamental members may be detachably mounted in the central square openings of the top links. In Figs. 1 and 4 the square ornamental plate 100 is mounted in one of said openings by the downwardly extending lugs 101 which are bent inwardly against the bottom face of the plate 14.

Figure 13:
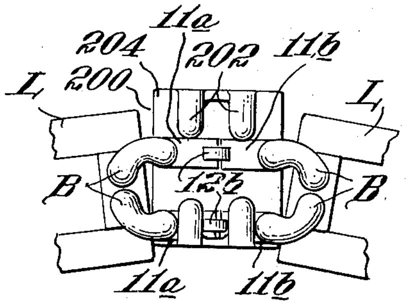
Fig. 13 is a bottom plan similar to Fig. 10 showing the position of the two adjacent links while inserting the detachable spacer link therebetween.

In the event the bracelet is too short for the customer's wrist, a detachable spacer piece or link 200 (Figs. 9 to 13) may be inserted between two adjacent top links L when they are extended away from each other as in Fig. 4, and Fig. 13, which detachable spacer link prevents such two adjacent top links from coming together on retraction of the linkage and hence lengthens the linkage by the length of the detachable spacer link. Detachable spacer link 200 has a top portion 206 which has somewhat the same general appearance on the top as the top links L with their shells attached thereto. In fact, detachable spacer link 200 may comprise a plate with a top shell attached thereto (not shown) in the same manner that the shells are attached to the top links. Attached to the bottom of the top portion 206 of spacer link 200, as by soldering or welding, is a plate 204 having downwardly bent portions 208 at its two opposite sides, each bent portion 208 extending into two prongs 202 bent inwardly of said bent portion, to form opposed U-shaped pockets 209. If desired, top portion 206 and plate 204 with its bent portions 208 and prongs 202 may all be formed from one piece of metal plate with a shell attached to the top thereof in the same manner that shells 15 are attached to top links L.

Figure 10:
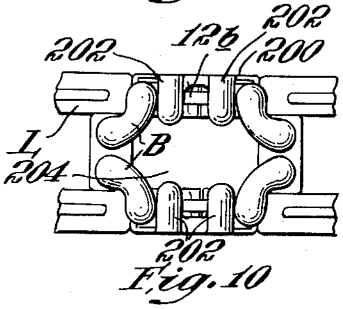
Fig. 10 is a bottom plan of Fig. 9, showing two adjacent links and the detachable spacer link inserted therebetween.

To insert detachable spacer link 200 into the linkage to lengthen the same, the linkage is extended as in Figs. 4 and 13, and while it is so extended, the two prongs 202 at one side of the spacer link 200 are slid under intermediate links 11*a* and 11*b* at one side of the linkage, one prong under each link, so as to straddle the downwardly depressed tongue 12*b* as shown in Fig. 13. Thereafter, the links 11*a* and 11*b* on the other side of the linkage are pushed inwardly so that the prongs 202 at the other side of detachable spacer link 200 can be slid under such links 11*a* and 11*b* on the other side of the linkage, one prong under each link, so as to straddle the downwardly depressed tongue 12*b* thereof as shown in Fig. 10. The linkage is then permitted to retract. However, the detachable spacer link 200 prevents the two adjacent top links between which it is inserted from coming together and hence the linkage is accordingly lengthened, when retracted, by the length of the detachable spacer link. Prongs 202 may have shells or other members 211 attached to the bottoms thereof for decorative purposes and to assure smoothness of the prong bottoms which come into contact with the wrist.

Another type of detachable spacer link 220 is shown inserted in the linkage in Figs. 14 to 18. Detachable link 220 comprises a top portion 228 designed to blend in with the top links L. Attached to the bottom of top portion 228 is a plate 224 having downwardly extending portions 226 at opposite sides thereof, each portion 226 extending inwardly to form a prong 222 having a longitudinal groove 230 along its bottom which does not extend to the end of the prong. Plate 224, portion 226 and prongs 222 form opposed U-shaped pockets 225. Top portion 228 may comprise a shell attached to the top of plate 224 in the same manner as shells 15 are attached to top links L. The bottom of prongs 222 may have attached thereto ornamental shells or members to assure smoothness.

Figure 15:
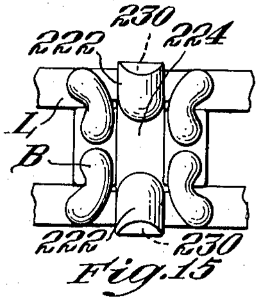
Fig. 15 is a bottom plan of Fig. 14 showing two adjacent links and the detachable spacer link.
Figure 18:
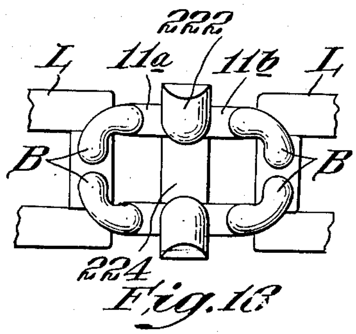
Fig. 18 is a bottom plan similar to Fig. 15 showing the position of the two adjacent links while inserting the detachable spacer link therebetween.

In inserting detachable spacer link 220, the linkage is extended as shown in Fig. 4 and Fig. 18. One of the prongs 222 is then slid under the tongue or bar 12*b* of the intermediate links 11*a* and 11*b* at one side of the linkage so that bar 12*b* slides into groove 230 of such prong 222. Thereafter, links 11*a* and 11*b* with their tongue 12*b* on the other side of the linkage are pushed inwardly as in Fig. 13 so that such tongue 12*b* on the other side of the linkage can be slid into the U-shaped pocket formed by the other prong 222 and into groove 230 thereof as shown in Fig. 18. The linkage is then permitted to retract as shown in Fig. 15, spacer link 220 preventing its two adjacent links between which it is inserted from coming together and hence lengthening the bracelet by the length of the link 220.

Figure 20:
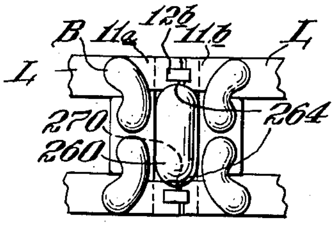
Fig. 20 is a bottom plan of Fig. 19 showing two adjacent links and the detachable spacer link.
Figure 11:
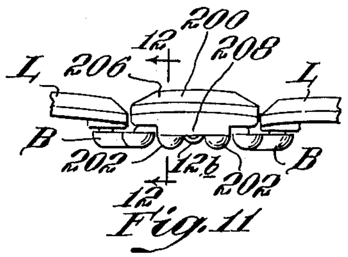
Fig. 11 is a side view of the linkage of Fig. 10.
Figure 16:
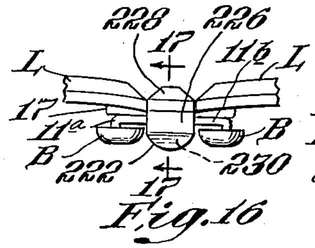
Fig. 16 is a side view of the linkage of Fig. 15.
Figure 21:
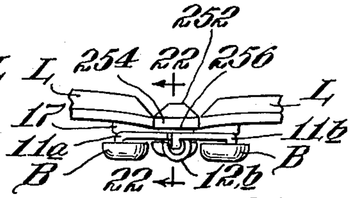
Fig. 21 is a side view of the linkage of Fig. 20.
Figure 12:
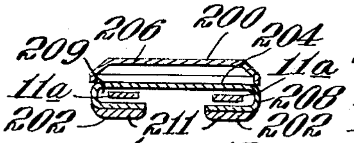
Fig. 12 is a section along the line 12—12 of Fig. 11.
Figure 17:
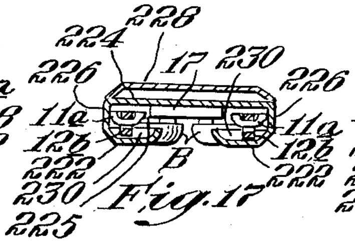
Fig. 17 is a section along the line 17—17 of Fig. 16.
Figure 22:
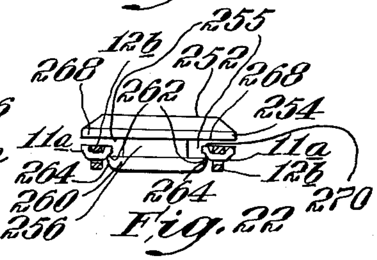
Fig. 22 is a section taken along 22—22 of Fig. 21.

Still another type of detachable link 250 is disclosed in Figs. 19 to 22. Detachable link 250 comprises a plate 254 having a shell 252, a portion 256 extending downwardly from the middle of plate 254 and prongs 260 extending outwardly from each side of portion 256, each outwardly extending prong having an upper edge 262. Each prong forms with downwardly extending portion 256 and one end 268 of plate 254 a U-shaped pocket 255. To insert detachable link 250 in the linkage to lengthen the same, the linkage is extended and one of the prongs 260 is slid under abutting corners 270 of links 11*a* and 11*b* at one side of the linkage, the end 264 of prong 260 abutting against tongue 12*b* and edge 262 of prong 260 abutting against the bottoms of abutting corners 270 of such links 11*a* and 11*b*. Thereafter, while still extended, the linkage is compressed to permit the other prong 260 to be slid under abutting corners of links 11*a* and 11*b* at the other side of the linkage so that the end 264 of the other prong 260 abuts against tongue 12*b* on the other side of the linkage and edge 262 of the other prong 260 abuts against the bottoms of abutting corners 270 of the links 11*a* and 11*b* on the other side of the linkage. The linkage is then permitted to retract as shown in Fig. 20. Detachable spacer link 250 prevents its adjacent links between which it is inserted from coming together and hence lengthens the linkage by its own length.

The fact that the length of the linkage of the present invention can be adjusted by hand without tools and without taking apart any portion of the linkage constitutes an important feature of the present invention.

Figure 23:
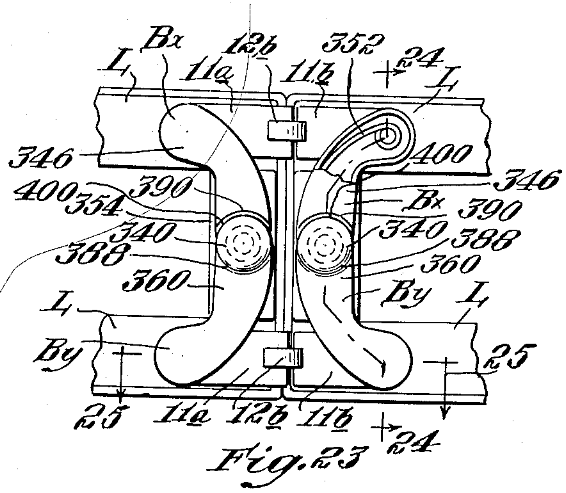
Fig. 23 is a bottom plan view of a portion of another embodiment of the linkage of the present invention in retracted position with part of the bottom shell of one of the bottom links broken away to reveal part of the connection between a bottom link and an intermediate link.
Figure 24:
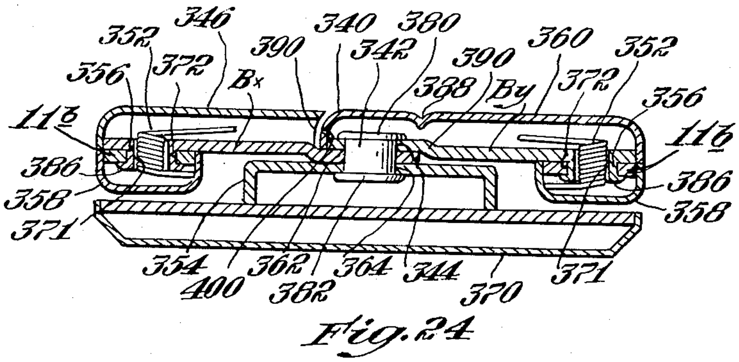
Fig. 24 is a section along 24—24 of Fig. 23.
Figure 25:
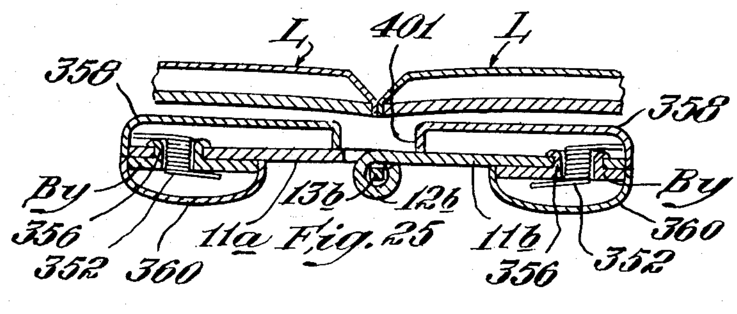
Fig. 25 is a section along 25—25 of Fig. 23.
Figure 26:
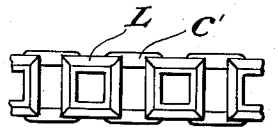
Fig. 26 is a fragmentary top plan view of a portion of another embodiment of the linkage of the present invention, the links being in an extended position and the linkage being the same as that of Figs. 2 to 8 except for the intermediate links.
Figure 34:
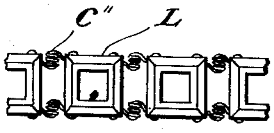
Fig. 34 is a fragmentary top plan view of a portion of another embodiment of the linkage of the present invention similar to that of Fig. 26 but showing a different embodiment of the intermediate link.
Figure 27:
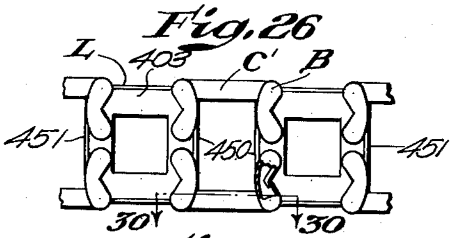
Fig. 27 is a bottom plan view of the linkage of Fig. 26.
Figure 35:
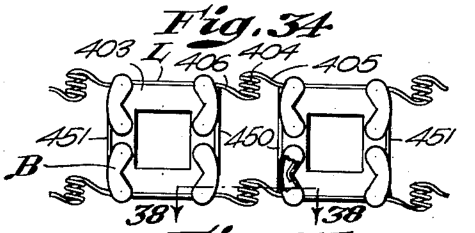
Fig. 35 is a bottom plan view of the linkage of Fig. 34.
Figure 28:
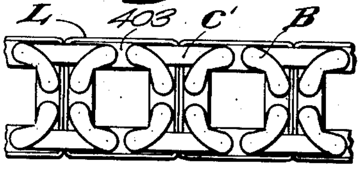
Fig. 28 is a bottom plan view of the linkage of Fig. 26 with the links in retracted position.
Figure 36:
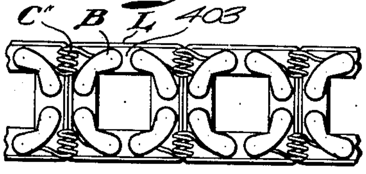
Fig. 36 is a bottom plan view of the linkage of Fig. 34 with the links in retracted position.

Another embodiment of the present invention is shown in Figs. 23 to 25. In this embodiment two bottom links B*x* and B*y*, which are located on each side of each top link L, are both pivotally connected to the spacing block 354 by means of a common pivot pin 342 which passes through aperture 362 in one end of link B*x*, aperture 344 in one end of link B*y* and aperture 364 in spacing block 354. Pivot pin 342 has a widened head 380 and a flared out portion 382. Bottom link B*y* has a bend 390. Spacing block 354 is attached to the underside of top link L in the manner previously described when discussing the embodiment of Figs. 1 to 8.

The other ends of bottom links B*x* and B*y* are each pivotally connected to intermediate links 11*a* and 11*b* by means of round extruded tubular protrusions 356 located at such other ends of bottom links B*x* and B*y*, which protrusions 356 pass through apertures 372 in the ends of intermediate links 11*a* and 11*b* and then flare out into flared out portions 386. Each hollow protrusion has a spring 352 passing through the hollow portion 371 thereof, which spring is biased between a side of a shell 358 attached to the tops of links 11*a* and 11*b* and a side of bottom link shell 340 and 360 in the case of bottom link B*y* and the side of bottom link shell 346 in the case of bottom link B*x* so that such springs normally urge the outward ends of bottom links B*x* and B*y*, as well as the pivotal connections between intermediate links 11*a* and 11*b* and bottom links B*x* and B*y*, around pivot pin 342 toward the centers of the top links and hence urge the top links together into retracted position. The shell 360 and 340 of the link B*y* has a long oval portion 360 as shown in Fig. 24 which covers the major portion of bottom link B*y* and a rounded portion 340, integral with portion 360, which covers pivot pin 342 and the remainder of link *By*. These two portions are separated by a rounded trough 388 at the top thereof, the sides of which cooperate with the top of the rounded edges of portion 340 to give portion 340 the appearance of a complete circular piece as shown in Fig. 23. Shell 346 covers a portion of bottom link B*x* and has a concave edge 390 which is designed to fit snugly against the rounded convex edge 400 of shell 340, as shown, so as to move around the rounded convex edge 400 of shell 340 in response to pivotal movements of B*x*, and so as to permit the rounded convex edge 400 of 340 to move around such concave edge 390 in response to pivotal movements of link B*y*.

The tops of intermediate links 11*a* and 11*b* are provided with shells 358. The adjacent edges 401 of shells 358 are spaced apart sufficiently so as not to interfere with the action of the hinge formed by tongue 12*b*, bar 13*b* and slot 13*a*. The shells of links 11*a*, and 11*b*, B*x* and B*y* are attached to their respective links in the same manner as disclosed above in describing the first embodiment.

If desired, stops such as those disclosed in Fig. 7 may be utilized on links 11*a* and 11*b* as well as links B*x* and B*y* for anchoring springs 352, rather than the sides of their respective shells.

With the use of the construction shown in Figs. 23 to 25 women's bracelets of reduced width may be produced.

Although Figs. 23 to 25 disclose a common pivot for B*x* and B*y* on each top link L, with springs located in the pivots between the intermediate and bottom links, it is within the scope of the present invention for B*x* and B*y* to be pivoted to the top link individually, that is, B*y* being pivoted to L by one pivot and B*x* by a separate pivot. In such event the separate pivots pivoting the bottom links to the top links may be of the type shown in Fig. 24 (a solid pin passing through the spacer of the top link and one of the bottom links) or of the hollow type disclosed in Fig. 8. In the latter case springs 30 may or may not be utilized in each of such pivots in addition to springs 352 in the pivots between the bottom and intermediate links.

Figure 29:
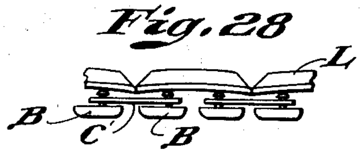
Fig. 29 is a side elevation of the linkage of Fig. 28.
Figure 33:
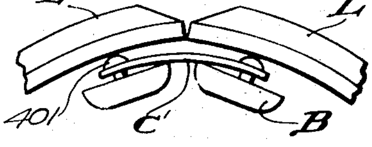
Fig. 33 is an enlarged side elevation of the linkage with the intermediate links flexed and the links in the position which they assume on the wrist of the user.

Another embodiment of the present invention is shown in Figs. 26 to 33. The linkage of this embodiment is the sam as the linkage of Figs. 1 to 8 inclusive except that each intermediate link C′ is made from a single thin strip of a transversely flexible material, such as spring steel, with its opposite ends pivotally connected to the bottom links B by means of rivets 400 passing through apertures in the ends of the links C′ and bottom links B and having flattened heads 401 and 402. When a transverse bending or flexing force is applied to the linkage (as when its ends are attached to a watch) the adjacent top links L move with relation to each other out of a horizontal plane such as is shown in Fig. 29 to a position such as is shown in Fig. 33, the opposite ends 451 of each pair of top links move downwardly relative to the adjacent ends 450 thereof, and the opposite ends of the link C′ move downwardly relative to the intermediate portion about a line which is generally perpendicular to the longitudinal center line of the linkage and generally parallel to the transverse plane of the top links L. When the flexing force is released the linkage may again assume the horizontal position shown in Fig. 29.

Still another embodiment is shown in Figs. 34 to 41. The linkage of this embodiment is the same as that of Figs. 26 to 33 except that each intermediate link C'' comprises a coil spring with coil 404 the axis of which is generally perpendicular to the center line of the linkage and generally parallel to the transverse plane of the top links. The coil 404 has a leg 406 extending from one side thereof which has a downwardly bent portion 407 which extends through an aperture in bottom link B and is headed or flattened at 408 whereby this leg 406 is pivotally attached to one bottom link. The coil 404 has a similar leg 405 extending in the opposite direction and having a downwardly bent portion 409 which passes through an aperture in the other bottom link B and is headed or flattened at 410. Thus the leg 405 is pivotally attached to this other bottom link B.

Figure 37:
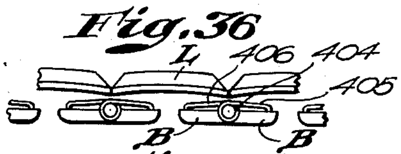
Fig. 37 is a side elevation of the linkage of Fig. 36.
Figure 30:
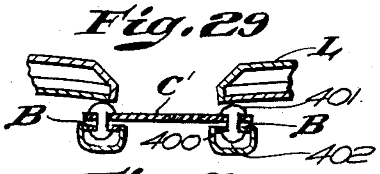
Fig. 30 is a section taken along the lines 30—30 of Fig. 27.
Figure 38:
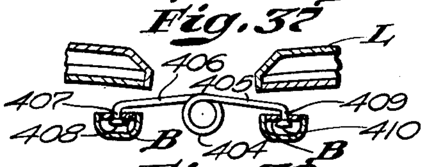
Fig. 38 is a section taken along the lines 38—38 of Fig. 35.
Figure 31:
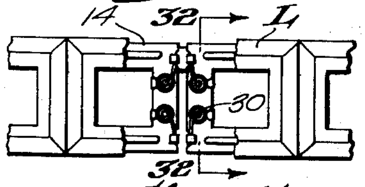
Fig. 31 is a top plan view of the linkage in retracted position with part of the top shells of two adjacent top links broken away to reveal part of the connections between the two top links and the four bottom links.
Figure 39:
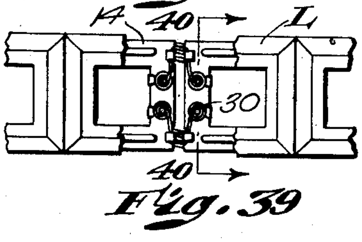
Fig. 39 is a top plan view of the linkage in retracted position with parts of the top shells of two adjacent top links broken away.
Figure 32:
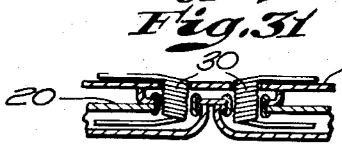
Fig. 32 is a section along the lines 32—32 of Fig. 31.
Figure 41:
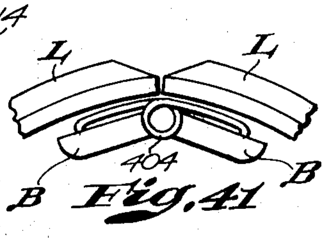
Fig. 41 is an enlarged side elevation of the linkage of Fig. 37 but with the intermediate links flexed and the links in the position which they assume on the wrist of a user.
Figure 40:
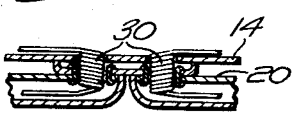
Fig. 40 is a section along the lines 40—40 of Fig. 39.

When a transverse flexing or bending force is applied to the linkage the adjacent top links L move with relation to each other out of a horizontal plane, the opposite ends 451 of the top links move downwardly with respect to the adjacent ends 450 thereof from the position of Fig. 37 to the position of Fig. 41, such movement being generally about the axis of each coil 404. Upon release of this flexing or bending force the coils 404 cause the legs 405 and 406 of intermediate links C'' to straighten out and the top links to return to the generally horizontal position shown in Figs. 37 and 38.

This application is a continuation in part of application Serial No. 352,469 filed May 1, 1953.

The spacer links of Figs. 9 to 22 may also be used with the embodiments of Figs. 26 to 41.

It should be understood that the present disclosure is for the purpose of illustration only and that the present invention includes all modifications and equivalents which fall within the scope of the appended claims.

I claim:

1. An extensible, self-retracting linkage comprising at least two adjacent top links, at least one intermediate link extending longitudinally of the linkage below said two adjacent top links when the linkage is retracted and viewed from the top, means for pivotally connecting one end of said intermediate link to the first of said top links, means for pivotally connecting the other end of said intermediate link to the second of said top links, each of said means for pivotally connecting said intermediate link ends and said top links together comprising a bottom link extending from adjacent to a longitudinal side of the linkage toward the longitudinal center line thereof, at least one end portion of said intermediate link being located between the adjacent top portion of said bottom link and the adjacent bottom portion of said one of said top links when said linkage is retracted, said bottom link having one end pivotally connected to one end of said intermediate link for relative movement with respect thereto about an axis which is generally perpendicular to the top of the bottom link and having the other end pivotally connected to one of said top links for relative movement with respect thereto about an axis which is generally perpendicular to the top of the bottom link, spring means associated with said bottom links for urging said top links toward each other longitudinally of the linkage while permitting them to be extended relative to each other longitudinally of the linkage, said intermediate link including at least two portions and means for connecting said two portions for movement of the opposite ends of said portions relative to an intermediate portion of the intermediate link at least about a line which is generally perpendicular to the longitudinal center line of the linkage and is generally parallel to the transverse plane of said top links.

2. A linkage according to claim 1 wherein said two intermediate link portions comprise two intermediate link parts and said means connecting said portions comprises means for pivotally connecting said two intermediate link parts together in end to end relationship for relative movement of the opposite ends of said parts at least about a line which extends through said pivotal connecting means, is generally perpendicular to the longitudinal center line of linkage and is generally parallel to the transverse plane of said top links.

3. A linkage according to claim 1 wherein at least portions of the adjacent ends of said top links abut each other when the linkage is in retracted position.

4. A linkage according to claim 1 also comprising a spacer link extending transversely of the linkage between the adjacent ends of said first and second top links and, when the linkage is in retracted position, said spacer link having at least a portion of one of its sides engaging at least a portion of the adjacent end of said first top link and at least a portion of its opposite side engaging at least a portion of the adjacent end of said second top link, thereby to hold said ends of said top links spaced apart a predetermined distance longitudinally of the linkage when said top links are in retracted position, and means for detachably securing said spacer link between said first and second top links.

5. A linkage according to claim 1 wherein, when the linkage is in retracted position and viewed from the top, said bottom link extends from its pivotal connection to the adjacent intermediate link part in a direction diagonally toward the end of the top link to which it is pivotally connected.

6. A linkage according to claim 1 wherein two laterally spaced intermediate links are provided to secure said two adjacent top links together, the first of said intermediate links being located adjacent to one longitudinal side of the linkage and the second of said intermediate links being spaced laterally of the linkage from said first intermediate link and located adjacent to the opposite longitudinal side of the linkage.

7. A linkage according to claim 1 wherein at least two laterally spaced intermediate links are provided to secure said two adjacent top links together, the first of said intermediate links being located adjacent to one longitudinal side of the linkage and the second of said intermediate links being spaced laterally of the linkage from said first intermediate link and located adjacent to the opposite longitudinal side of the linkage, said linkage also comprising a spacer link extending transversely of the linkage between at least portions of the adjacent ends of said two adjacent top links and, when the linkage is in retracted position, engaging at least a portion of the adjacent end of the first of said adjacent top links and at least a portion of its opposite end engaging at least a portion of the adjacent end of the second of said adjacent top links, thereby to hold said ends of said top links spaced apart a predetermined distance longitudinally of the linkage when said top links are in retracted position, and means for securing said spacer link between said first and second top links.

8. A linkage according to claim 2 wherein at least portions of the adjacent ends of said top links abut each other when the linkage is in retracted position and the means for pivotally connecting the adjacent ends of said intermediate link parts together is positioned generally below and is substantially concealed by said adjacent ends of said top links when said top links are in fully retracted position and the linkage is viewed from the top but said connecting means is visible in the gap formed between said adjacent ends of said top links when said top links are moved from retracted toward extended position by stretching the linkage longitudinally.

9. A linkage according to claim 2 wherein at least one of said intermediate link parts is provided with a transverse slot adjacent to one end and said means for securing the adjacent ends of said two intermediate link parts together comprises a longitudinally extending member which is formed to extend through said transverse slot and thence to extend along the intermediate link part in which the slot is formed whereby said intermediate link parts may readily be detached.

10. An extensible, self-retracting linkage comprising at least two adjacent top links, at least four bottom links associated with said top links, each bottom link extending from adjacent to a longitudinal side of the linkage toward the longitudinal center line thereof, being below the adjacent portion of the adjacent top link and being located within the longitudinal sides of the linkage, at least two intermediate links each comprising two parts in end to end relationship, means for pivotally connecting the adjacent ends of said intermediate link parts together for relative movement of said parts at least about an axis which is generally perpendicular to the longitudinal center line of the linkage and which is generally parallel to the transverse plane of said top links, at least an end portion of the first part of said first intermediate link being located between the adjacent top portion of the first of said bottom links and the adjacent bottom portion of the first of said top links, at least an end portion of the second part of the first intermediate link being located between the adjacent top portion of the second of said bottom links and the adjacent bottom portion of the second of said top links, at least an end portion of the first part of said second intermediate link being located between the adjacent top portion of the third of said bottom links and the adjacent bottom portion of the first of said top links and at least an end portion of the second part of said second intermediate link being located between the adjacent top portion of the fourth of said bottom links and the adjacent bottom portion of the second of said top links, each of said bottom links having one end pivotally connected to one end of the adjacent intermediate link part for relative movement with respect thereto about an axis which is generally perpendicular to the top of the bottom link and the other end pivotally connected to the adjacent top link for relative movement with respect thereto about an axis which is generally perpendicular to the top of the bottom link, and spring means associated with said bottom links for urging said top links toward each other longitudinally of the linkage while permitting them to be extended relative to each other longitudinally of the linkage.

11. A linkage according to claim 10 also comprising a spacer link extending transversely of the linkage between the adjacent ends of said first and second top links and, when the linkage is in retracted position, said spacer link having at least a portion of one of its sides engaging at least a portion of the adjacent end of said first top link and at least a portion of its opposite side engaging at least a portion of the adjacent end of said second top link, thereby to hold said ends of said top links spaced apart a predetermined distance longitudinally of the linkage when said top links are in retracted position, and means for detachably securing said spacer link between said first and second top links.

12. A linkage according to claim 10 also comprising a spacer link extending transversely of the linkage between the adjacent ends of said first and second top links, and, when the linkage is in retracted position, said spacer link having at least a portion of one of its sides engaging at least a portion of the adjacent end of said first top link and at least a portion of its opposite side engaging at least a portion of the adjacent end of said second top link, thereby to hold said ends of said top links spaced apart a predetermined distance longitudinally of the linkage when said top links are in retracted position, the top portion of said spacer link being located generally in the same plane as that of said first and second top links when the linkage is placed on a flat surface, and means for securing said spacer link to said intermediate links comprising two members extending downwardly from the bottom portion of said spacer link, one on each side of the longitudinal center line of the linkage, each of said downwardly extending members having a prong on its lower end extending generally perpendicular to the longitudinal center line of the linkage and forming with said bottom portion of the spacer link a groove for slidably receiving at least a portion of the adjacent intermediate link.

13. A linkage according to claim 10 wherein, when the linkage is in retracted position and viewed from the top, said first bottom link extends from its pivotal connection to the first part of the first intermediate link in a direction diagonally toward the end of said first top link to which it is pivotally attached, said second bottom link extends from its pivotal connection to the second part of the first intermediate link in a direction diagonally toward the end of said second top link to which it is pivotally attached, the third bottom link extends from its pivotal connection to the first part of the second intermediate link in a direction diagonally toward the end of said first top link to which it is pivotally attached and the fourth bottom link extends from its pivotal connection to the second part of the second intermediate link in a direction diagonally toward the end of the second top link to which it is pivotally attached.

14. An extensible, self-retracting linkage comprising three layers of overlapping links when viewed from the side, the top layer comprising a series of top links which extend from longitudinal side to longitudinal side of the linkage when viewed from the top and the adjacent ends of which abut each other when the linkage is fully retracted, the intermediate layer comprising two laterally spaced series of intermediate links when the linkage is viewed from the bottom, one series extending longitudinally of the linkage at one side of the linkage and the other series extending longitudinally of the linkage at the other side of the linkage, and when the linkage is in retracted position and viewed from the top said intermediate links being positioned below and concealed by said top links, each of said intermediate links comprising at least two portions and means for connecting said two portions for movement of the opposite ends of said portions relative to an intermediate portion of the intermediate link at least about a line which is generally perpendicular to the longitudinal center line of the linkage and which is generally parallel to the transverse plane of said top links, the bottom layer comprising a series of bottom links each having one end pivotally secured to the bottom of a top link for relative movement with respect thereto about an axis which is generally perpendicular to the top of the bottom link and the other end pivotally secured to an end of an adjacent intermediate link for relative movement with respect thereto about an axis which is generally perpendicular to the top of the bottom link, and when the linkage is in retracted position and viewed from the top said bottom links being positioned below and concealed by said top links, and spring means associated with said bottom links for urging the adjacent ends of said top links towards each other longitudinally of the linkage while permitting them to be extended relative to each other longitudinally of the linkage.

15. A linkage according to claim 14 also comprising a spacer link extending transversely of the linkage between the adjacent ends of two adjacent top links and, when the linkage is in retracted position, said spacer link having at least a portion of one of its sides engaging at least a portion of the adjacent end of the first of said top links and at least a portion of its opposite side engaging at least a portion of the adjacent end of the second of said top links, thereby to hold said ends of said top links spaced apart a predetermined distance longitudinally of the linkage when said top links are in retracted position, and means for detachably securing said spacer link between said two adjacent top links.

16. A linkage according to claim 15 wherein the means for detachably securing the spacer link between the two adjacent top links comprises two members extending downwardly from the bottom portion of the spacer link, one on each side of the longitudinal center line of the linkage, each of said downwardly extending members having a prong on its lower end extending generally perpendicular to the longitudinal center line of the linkage and forming with said bottom portion of the spacer link a groove for slidably receiving at least a portion of the adjacent intermediate link.

17. An extensible, self-retracting linkage comprising at least two adjacent top links and top link connecting means located below said two adjacent top links when the linkage is retracted and viewed from the top for connecting said top links together for movement of the opposite ends of said top links relative to the adjacent ends of said top links and for resiliently urging the adjacent ends of the top links toward each other longitudinally of the linkage while permitting them to be extended relative to each other longitudinally of the linkage, said top link connecting means comprising at least two bottom links, the first of which is pivotally connected at one end to one of said top links for relative movement with respect thereto about an axis which is generally perpendicular to the top of said first bottom link and the second of which is pivotally connected to the other of said top links for relative movement with respect thereto about an axis which is generally perpendicular to the top of the second bottom link, a transversely flexible bottom link connecting member extending longitudinally of the linkage when the linkage is viewed from the top, said bottom link connecting member being pivotally connected at one end portion to the other end of said first bottom link for relative movement with respect thereto about an axis which is generally perpendicular to the top of said first bottom link and pivotally connected at its other end portion to the other end of said second bottom link for relative movement with respect thereto about an axis which is generally perpendicular to the top of said second bottom link, each of said bottom links extending from adjacent to a longitudinal side of the linkage toward the longitudinal center line thereof and, when the linkage is retracted, said end portions of said bottom link connecting member being located between the adjacent top portions of the bottom links and the adjacent bottom portions of the top links, the opposite ends of said bottom link connecting member being movable relative to an intermediate portion thereof at least about a line which is generally perpendicular to the longitudinal center line of the linkage and is generally parallel to the transverse plane of said top links due to the transverse flexibility of said bottom link connecting member, and spring means associated with said bottom links for urging said top links toward each other longitudinally of the linkage while permitting them to be extended relative to each other longitudinally of the linkage.

18. A linkage according to claim 17 wherein the said bottom link connecting member comprises at least two portions and means for connecting said two portions for movement of the opposite ends of said portions relative to an intermediate portion of the bottom link connecting member at least about a line which is generally perpendicular to the longitudinal center line of the linkage and is generally parallel to the transverse plane of said top links, whereby said transverse flexibility of said bottom link connecting member is provided.

19. A linkage according to claim 18 wherein said two bottom link connecting member portions comprise two parts and said means connecting said portions comprises means for pivotally connecting said two bottom link connecting member parts together in end to end relationship for relative movement of the opposite ends of said parts at least about a line which extends through said pivotal connecting means, is generally perpendicular to the longitudinal center line of the linkage and is generally parallel to the transverse plane of said top links.

20. A linkage according to claim 17 also comprising a spacer link extending transversely of the linkage between the adjacent ends of said first and second top links and, when the linkage is in retracted position, said spacer link having at least a portion of one of its sides engaging at least a portion of the adjacent end of said first top link and at least a portion of its opposite side engaging at least a portion of the adjacent end of said second top link, thereby to hold said ends of said top links spaced apart a predetermined distance longitudinally of the linkage when said top links are in retracted position, and means for detachably securing said spacer link between said first and second top links.

21. A linkage according to claim 17 wherein said bottom link connecting member comprises a strip of transversely flexible material.

22. A linkage according to claim 17 wherein said bottom link connecting member comprises a coil spring with the axis of the coil generally perpendicular to the longitudinal center line of the linkage and generally parallel to the transverse plane of said top links.

References Cited in the file of this patent

UNITED STATES PATENTS

| | | |
|---|---|---|
| D. 154,142 | Pinson | June 14, 1949 |
| Re. 12,274 | Mason | Dec. 13, 1904 |
| 781,969 | Sommer | Feb. 7, 1905 |
| 836,080 | Bennett | Nov. 20, 1906 |
| 914,533 | Thornton | Mar. 9, 1909 |
| 1,263,903 | Kochanski | Apr. 23, 1918 |
| 2,267,968 | Augenstein | Dec. 30, 1941 |
| 2,429,393 | Cedar | Oct. 21, 1947 |
| 2,574,567 | Jaccarino | Nov. 13, 1951 |
| 2,677,230 | Pinson | May 4, 1954 |
| 2,695,493 | Pinson | Nov. 30, 1954 |

FOREIGN PATENTS

| | | |
|---|---|---|
| 628,966 | France | Nov. 2, 1927 |